US008534683B2

(12) United States Patent
Lautzenhiser et al.

(10) Patent No.: US 8,534,683 B2
(45) Date of Patent: Sep. 17, 2013

(54) WHEELCHAIR HANDLEBAR ADJUSTMENT

(75) Inventors: Lloyd L. Lautzenhiser, Verdi, NV (US); Wade Wolf, Belgrade, MT (US)

(73) Assignee: Brookefield Hunter, Inc., Belgrade, MN (US)

( * ) Notice: Subject to any disclaimer, the term of this patent is extended or adjusted under 35 U.S.C. 154(b) by 0 days.

(21) Appl. No.: 13/347,096

(22) Filed: Jan. 10, 2012

(65) Prior Publication Data

US 2012/0175855 A1 Jul. 12, 2012

Related U.S. Application Data

(60) Provisional application No. 61/431,170, filed on Jan. 10, 2011.

(51) Int. Cl.
*B62B 3/02* (2006.01)

(52) U.S. Cl.
USPC ................ 280/47.371; 280/47.36; 280/250.1; 280/655; 280/655.1; 74/551.3; 74/551.7; 16/110.1

(58) Field of Classification Search
USPC .......... 280/47.36, 47.371, 648, 655.1; 16/16, 16/113.1, 110.1, 421, 429, 430; 403/83, 403/109.1, 109.5, 109.7, 111, 166, 409.1, 403/33, 42–44, 81, 164; 74/551.1–551.8, 74/529
See application file for complete search history.

(56) References Cited

U.S. PATENT DOCUMENTS

| | | | | |
|---|---|---|---|---|
| 258,443 | A * | 5/1882 | Laighton | 403/385 |
| 3,643,528 | A * | 2/1972 | van der Loos | 477/113 |
| 5,605,345 | A * | 2/1997 | Erfurth et al. | 280/250.1 |
| 6,374,694 | B1 * | 4/2002 | Chen | 74/502.2 |
| 7,017,936 | B2 * | 3/2006 | Huang | 280/642 |
| 2005/0077760 | A1 * | 4/2005 | Smith | 297/42 |
| 2006/0157945 | A1 * | 7/2006 | Refsum | 280/47.371 |
| 2010/0207339 | A1 * | 8/2010 | Popp | 280/47.371 |

FOREIGN PATENT DOCUMENTS

WO WO 9531169 A1 * 11/1995

* cited by examiner

*Primary Examiner* — John R Olszewski
*Assistant Examiner* — Steve Clemmons
(74) *Attorney, Agent, or Firm* — Taylor IP, P.C.

(57) ABSTRACT

A mobility device including a frame, a plurality of wheels, a pair of telescopically arranged assemblies and a pair of handgrips. The plurality of wheels are rotatably coupled to the frame. The pair of telescopically arranged assemblies are coupled to the frame. The pair of handgrips are each coupled to a corresponding one of the pair of telescopically arranged assemblies. The pair of handgrips are arranged to adjust a height of the pair of telescopically arranged assemblies.

20 Claims, 19 Drawing Sheets

WHEELCHAIR HANDLEBAR ADJUSTMENT

CROSS REFERENCE TO RELATED APPLICATIONS

This is a non-provisional application based upon U.S. provisional patent application Ser. No. 61/431,170, entitled "WHEELCHAIR HANDLEBAR ADJUSTMENT", filed Jan. 10, 2011, which is incorporated herein by reference.

BACKGROUND OF THE INVENTION

1. Field of the Invention

The present invention relates to a mobility device for the aged and/or disabled, and, more particularly, to a mobility device that has individually adjustable handgrips.

2. Description of the Related Art

People who are unable to move about or are not fully ambulatory require the assistance of a traditional device such as a wheelchair or a walker in order to facilitate their mobility. Wheelchairs include a seat and often include feet rests and a pair of handles on the back for use of a second person in pushing the seated individual to a desired location. Wheelchairs typically have individual brakes located close to the two largest wheels and are individually engagable generally consisting of a toggle type mechanism which applies the brake by compressing a portion of the resilient wheel.

Some adult walkers include four wheels with a brake mechanism having a control associated with each of two handgrips. The braking mechanisms can be either positive or negative in that the brakes may be applied when the controls are released or when the controls are applied depending upon the particular configuration of the walker. The walker may have a seat upon which the operator can turn around and sit down on, thereby providing a temporary spot to rest. This is generally accomplished by having the seat facing towards the rear of the walker thereby requiring the individual to turn around and sit in the seat. This positions the handgrips generally in front of the seated individual and often some tubular frame is associated with the walker to provide some type of backrest. Walkers may have a device allowing for the adjustable height of the extending handgrips by way of a compressible feature associated with cylindrical tubes nested inside of each other. The adjustable features are typically located at the upper portion of the outer tube.

What is needed in the art is a mobility device with an easily adjusted handle height.

SUMMARY OF THE INVENTION

The invention in one form is directed to a mobility device including a frame, a plurality of wheels, a pair of telescopically arranged assemblies and a pair of handgrips. The plurality of wheels are rotatably coupled to the frame. The pair of telescopically arranged assemblies are coupled to the frame. The pair of handgrips are each coupled to a corresponding one of the pair of telescopically arranged assemblies. The pair of handgrips are arranged to adjust a height of the pair of telescopically arranged assemblies.

The invention in another form is directed to a telescopically arranged assembly for use with a mobility device having a frame and a plurality of wheels rotatably coupled to the frame, the telescopically arranged assembly includes an outer tube, an inner tube and a handgrip. The inner tube is arranged in a telescopically manner with the outer tube. The outer tube being coupled to the frame of the mobility device. The handgrip is coupled to the inner tube. The handgrip controlingly adjusts the position of the inner tube relative to the outer tube.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1A:
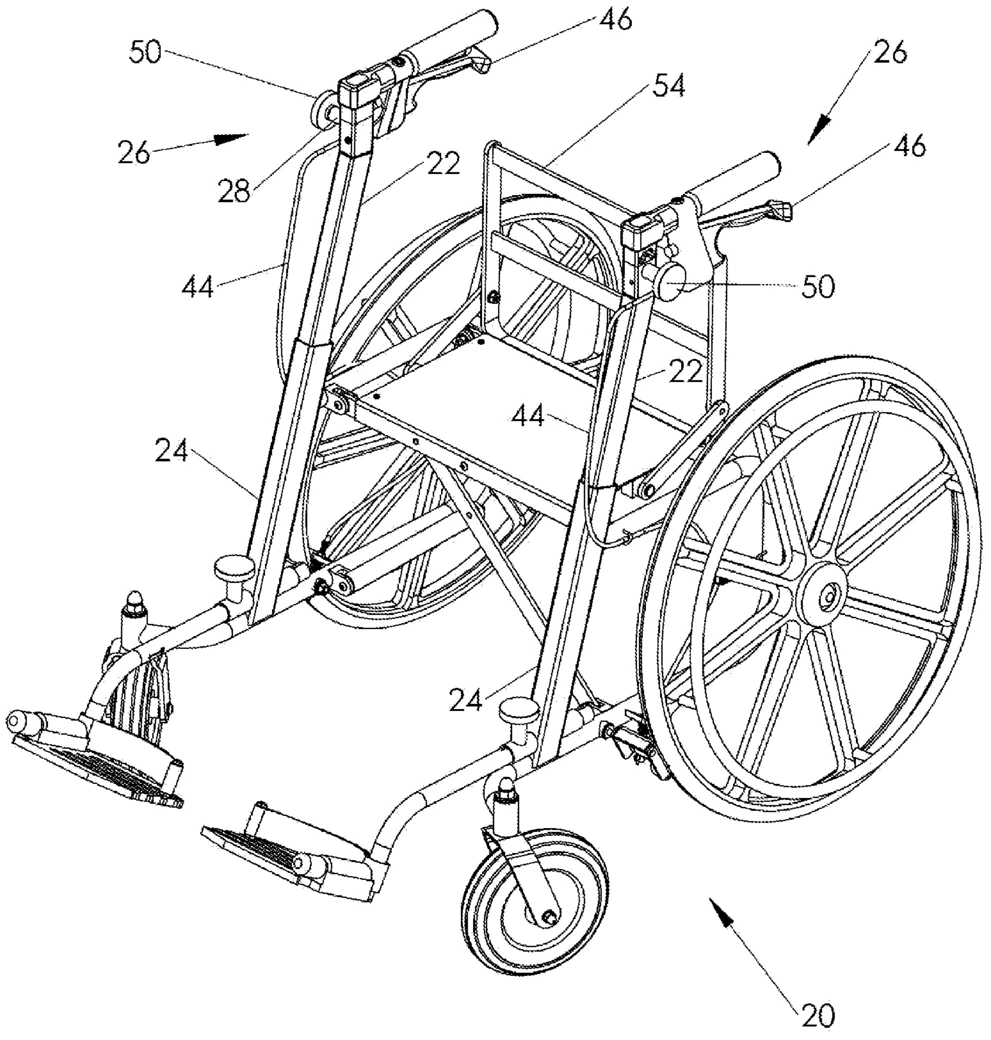
FIG. 1*a* is a perspective view of a mobility device having an embodiment of the adjustable handgrips of the present invention.
Figure 1B:
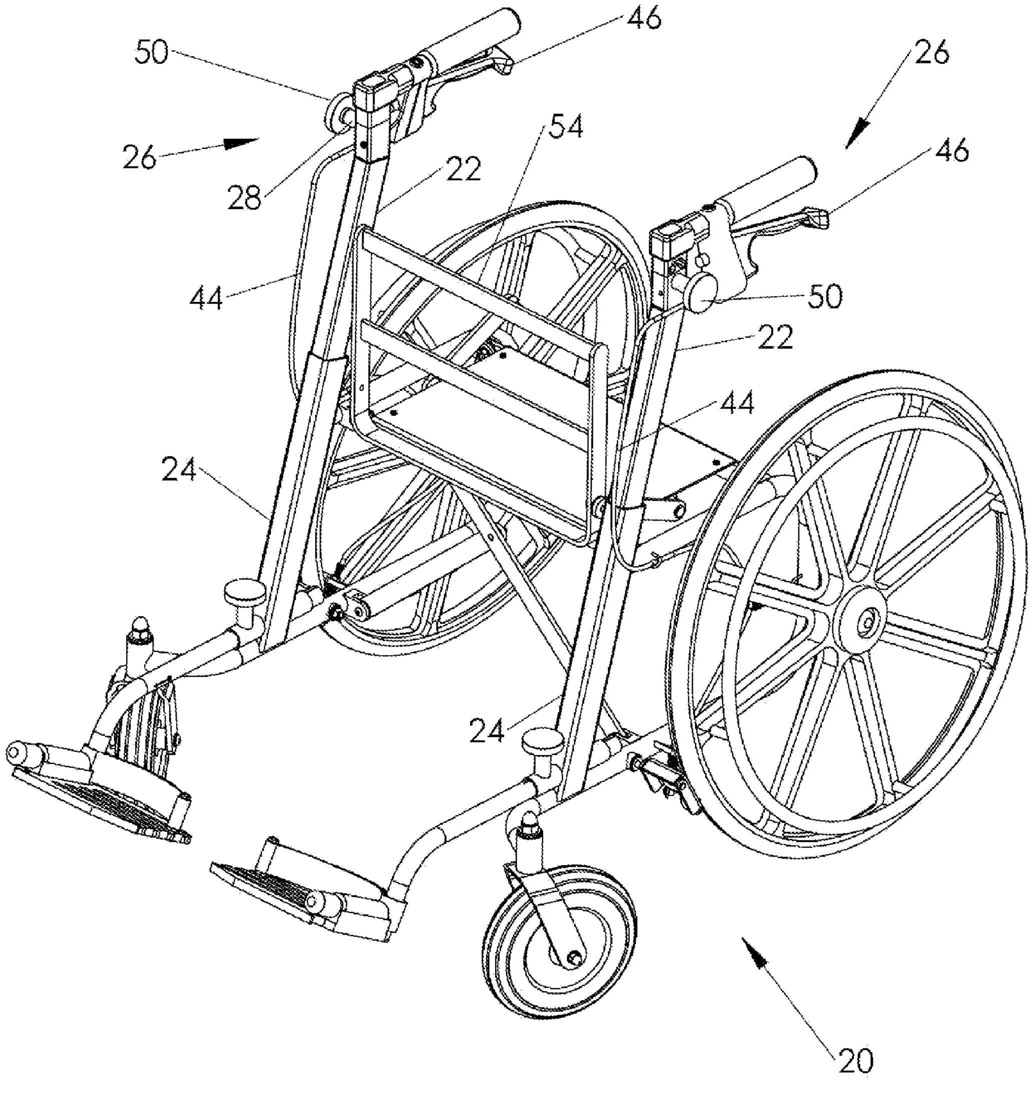
FIG. 1*b* is a perspective view of the mobility device of FIG. 1*a*, having the seat reversed.

Referring now to the drawings, and more particularly to FIGS. 1*a*, and 1*b*, there is illustrated a mobility device 20 which may be in the form of a walker 20 or a wheelchair 20. Mobility device 20 includes telescoping handgrip assemblies 26 having an inner tube 22 and an outer tube 24. A guide block 28 is associated with an upper portion of handgrip assemblies 26. Tubes 22 and 24 are arranged in a telescopic manner with tube 22 being adjustably fixed in tube 24 by way of the inventive nature of handgrip assemblies 26. A seat 54 is shown in these two views as being reversed, this allows seat 54 to be oriented as desired. The reversibility of seat 54 coacts with the reversible orientation of handgrip assemblies 26 to allow configuration possibilities not otherwise attainable.

Figure 2:
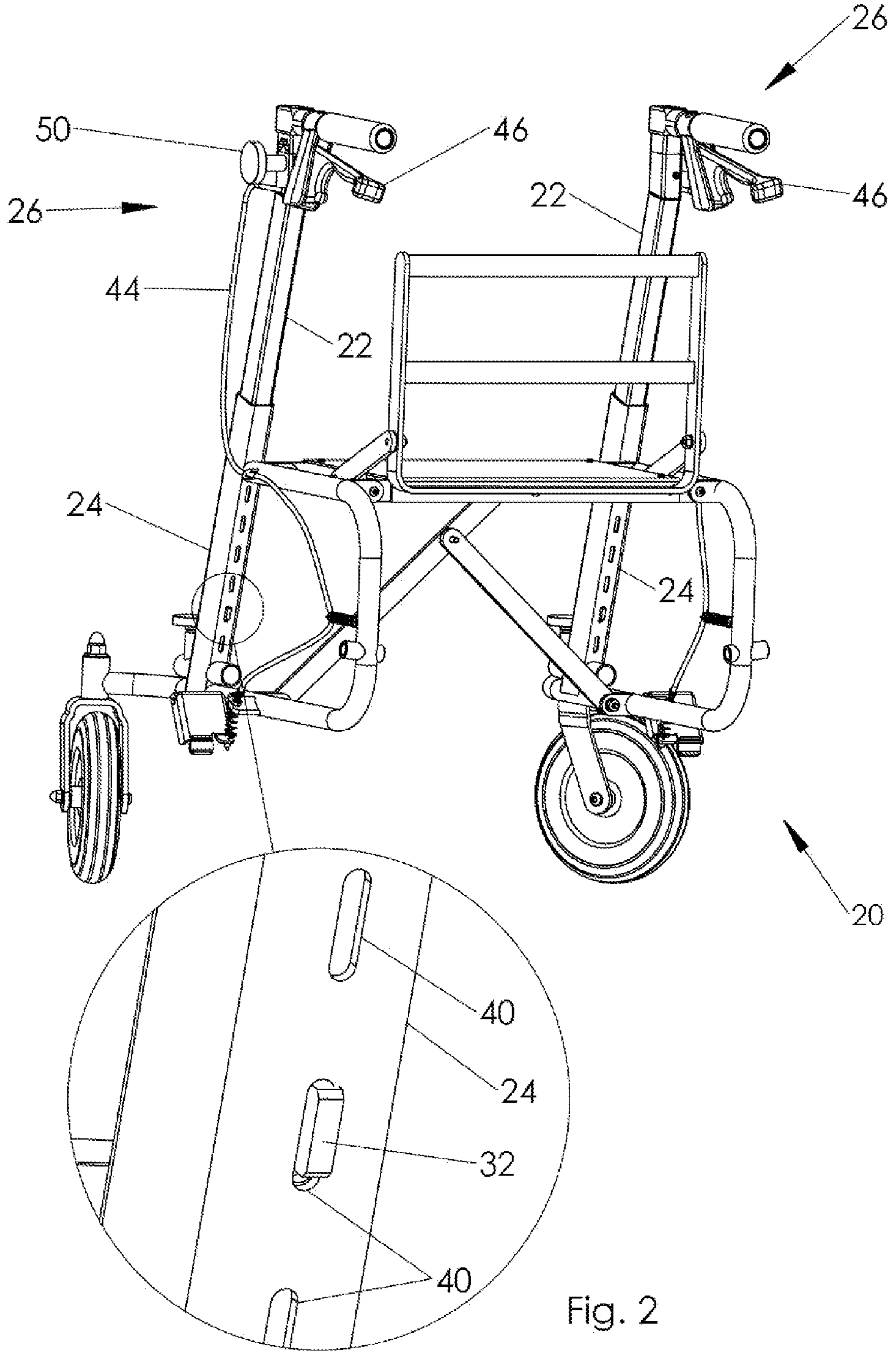
FIG. 2 is another view of a portion of the mobility device of FIGS. 1*a*-1*b* illustrating some of the adjustment features.
Figure 3:
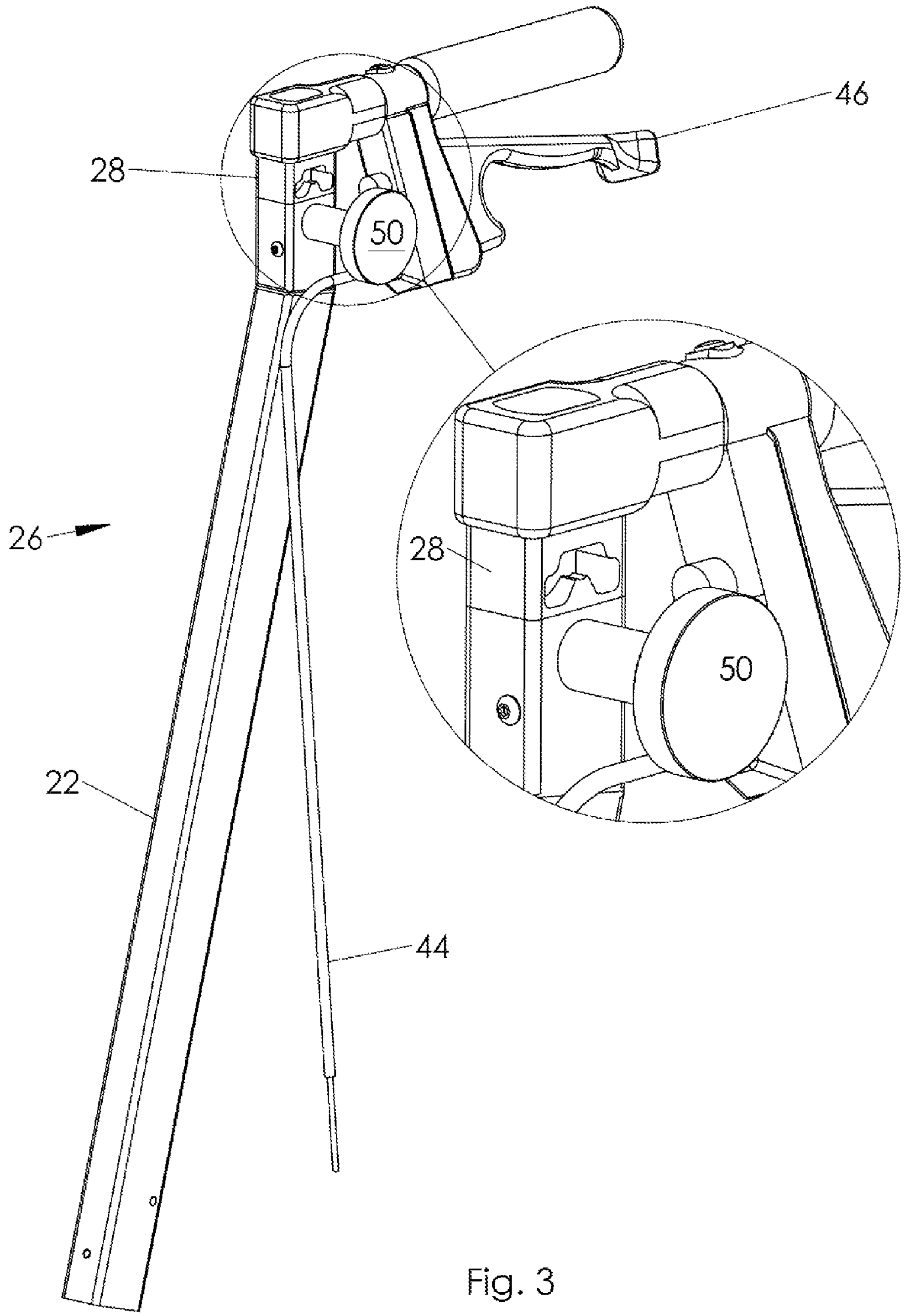
FIG. 3 is a perspective view of a left handgrip of the mobility device of FIGS. 1*a*, 1*b*, and 2.
Figure 4:
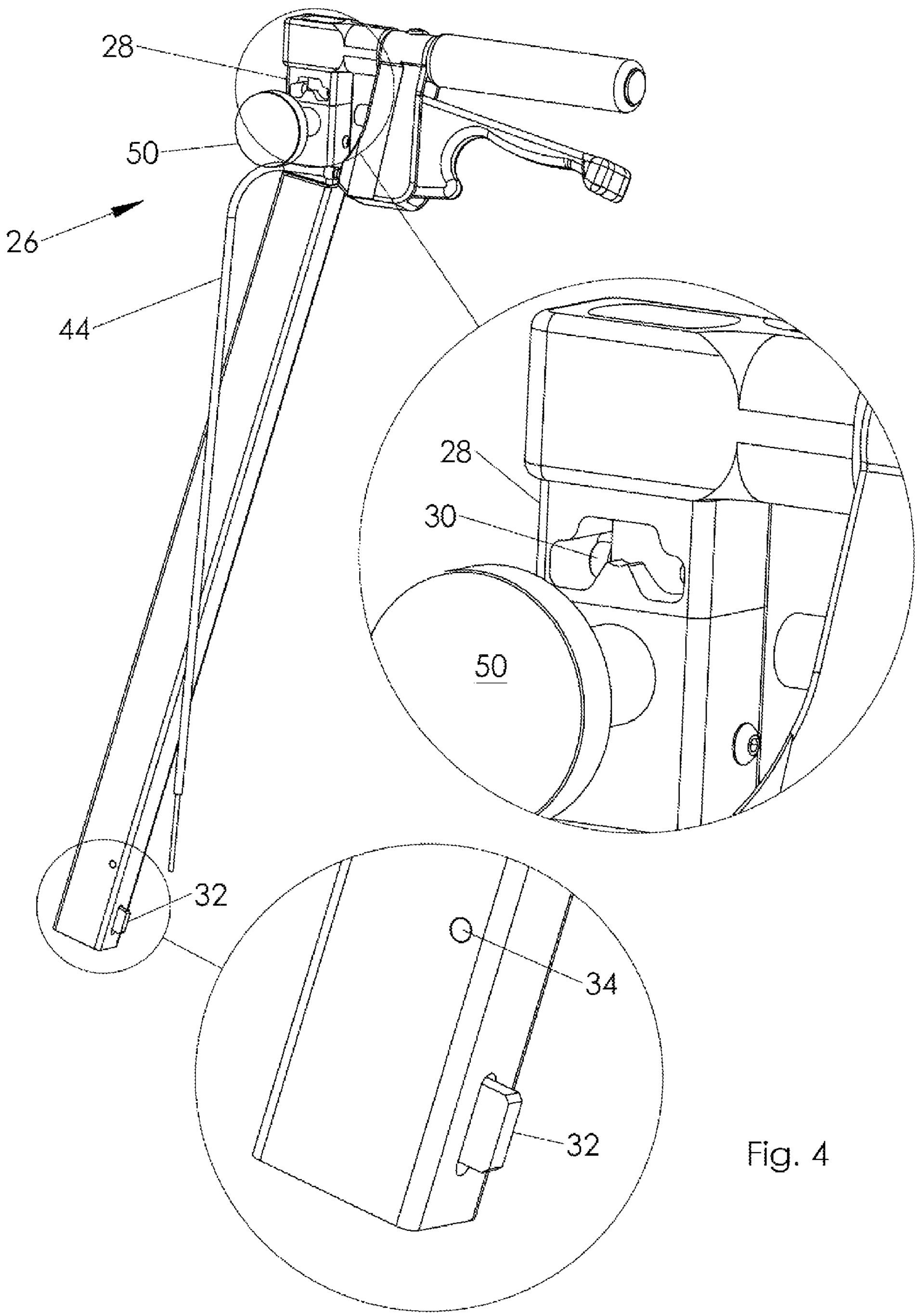
FIG. 4 is another view of the left handgrip illustrating portions of the adjustability features of the mobility device of FIGS. 1*a*, 1*b*, and 2.
Figure 5:
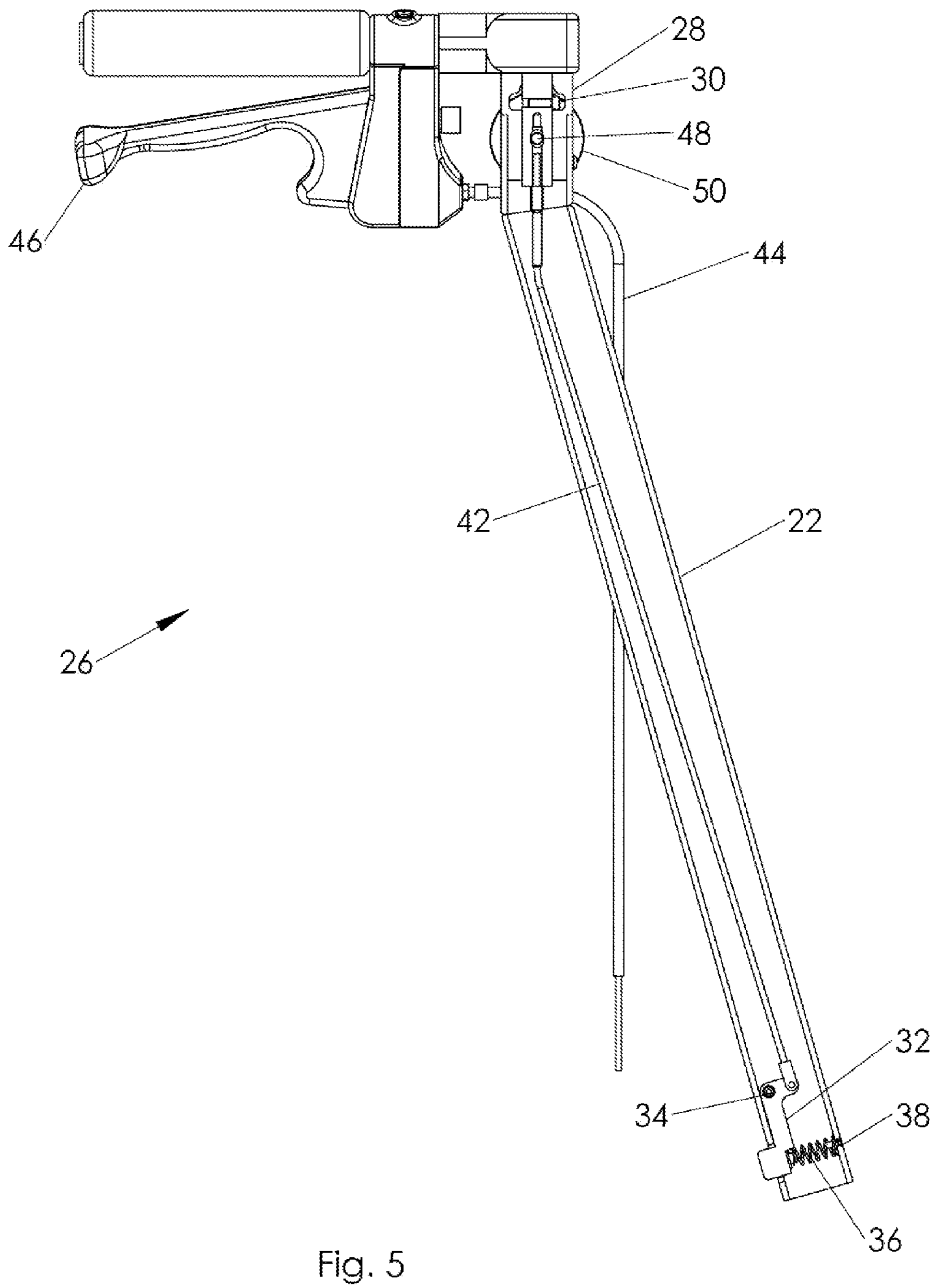
FIG. 5 is a partial interior side view of the left handgrip assembly of the mobility device of FIGS. 1*a*, 1*b*, and 2.

Now, additionally referring to FIGS. 2-6 a cap screw 30 is shown making up part of handgrip assembly 26. A latch plate 32 is illustrated in FIG. 5 extending through a slot identified elsewhere as slot 52 in inner tube 22. Latch plate 32 pivots about pivot pin 34 and is held in position by resilient biasing device 36 also known as a spring 36. Spring 36 is retained in position by a spring retainer pin 38. Latch plate 32 extends through slot 40 as illustrated in FIG. 2 of outer tube 24. As can also be seen in FIG. 2, portions of the frame and seat are all connected to each other as well as to handgrip assemblies 26. Each handgrip assembly 26 is telescopically arranged so that inner tube 22 slides within outer tube 24. Tubes 22 and 24 are illustrated as being rectangular in nature although other shapes are also contemplated. Generally tubes 22 and 24 will not be cylindrical in nature so that the alignment of latch plate 32 and slots 40 can be maintained thereby requiring an oriented tube arrangement so that tubes 22 and 24 do not rotate relative to each other but only slide relative to each other.

Figure 6:
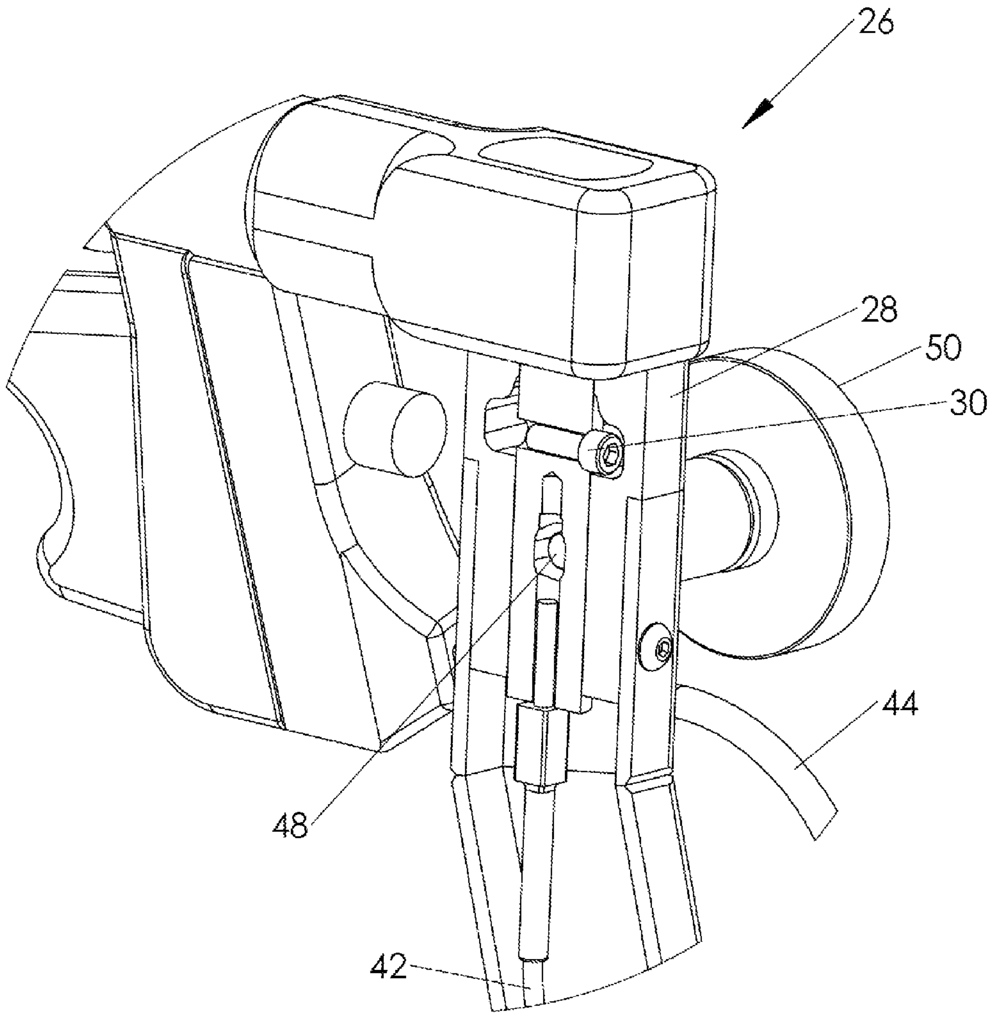
FIG. 6 is another partial interior view of details of the adjustment mechanism of handgrip illustrated in FIGS. 1*a*-5.

A release cable 42 extends down the inside of tube 22 as illustrated in FIGS. 5 and 6. Release cable 42 extends to connect to a portion of latch plate 32 allowing the mechanism in handgrip assembly 26 to collectively release the inner connection of latch plate 32 with inner tube 22 and outer tube 24 to allow the adjustment of handgrip assembly 26 in a longitudinal direction of tubes 22 and 24.

Now additionally referring to FIGS. 7-19 there is further illustrated some of the different views of handgrip assembly 26 as well as different positions of handgrip assembly 26 so that latch plate 32 can be selectively disengaged from outer tube 24. Also associated with handgrip assemblies 26 is a brake cable 44 extending therefrom to a brake mechanism associated with the wheels of mobility device 20. Brake lever 46 provides for controlled engagement of the brake system by way of brake cable 44. Advantageously in the present invention the braking mechanism is fully controllable even though the handgrip assembly 26 is used to adjust the positioning of inner tube 22 relative to outer tube 24.

Figure 7:
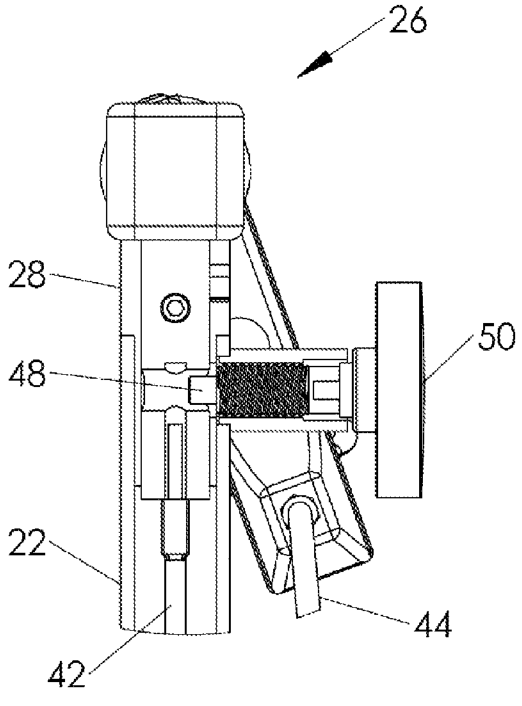
FIG. 7 is a partial interior view of the left handgrip illustrating the locked position of the telescoping tubes.
Figure 8:
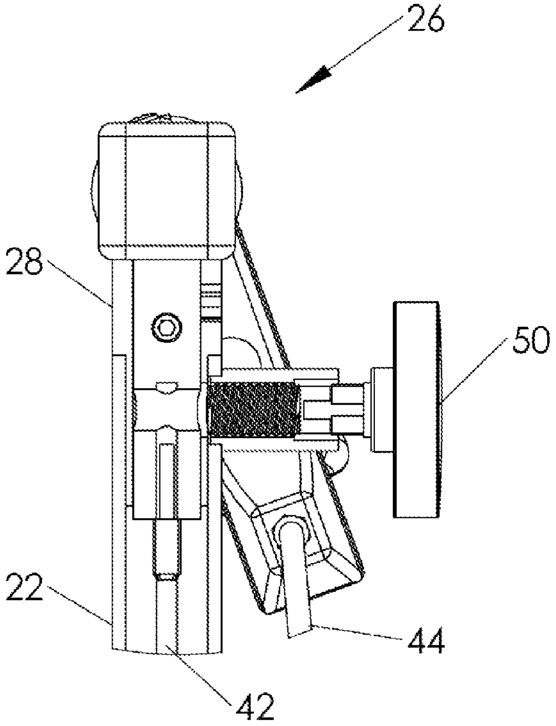
FIG. 8 is a partial interior view of the left handgrip illustrating an unlocked position of the adjustable feature of the hand grips of FIGS. 1*a*-7.
Figure 9:
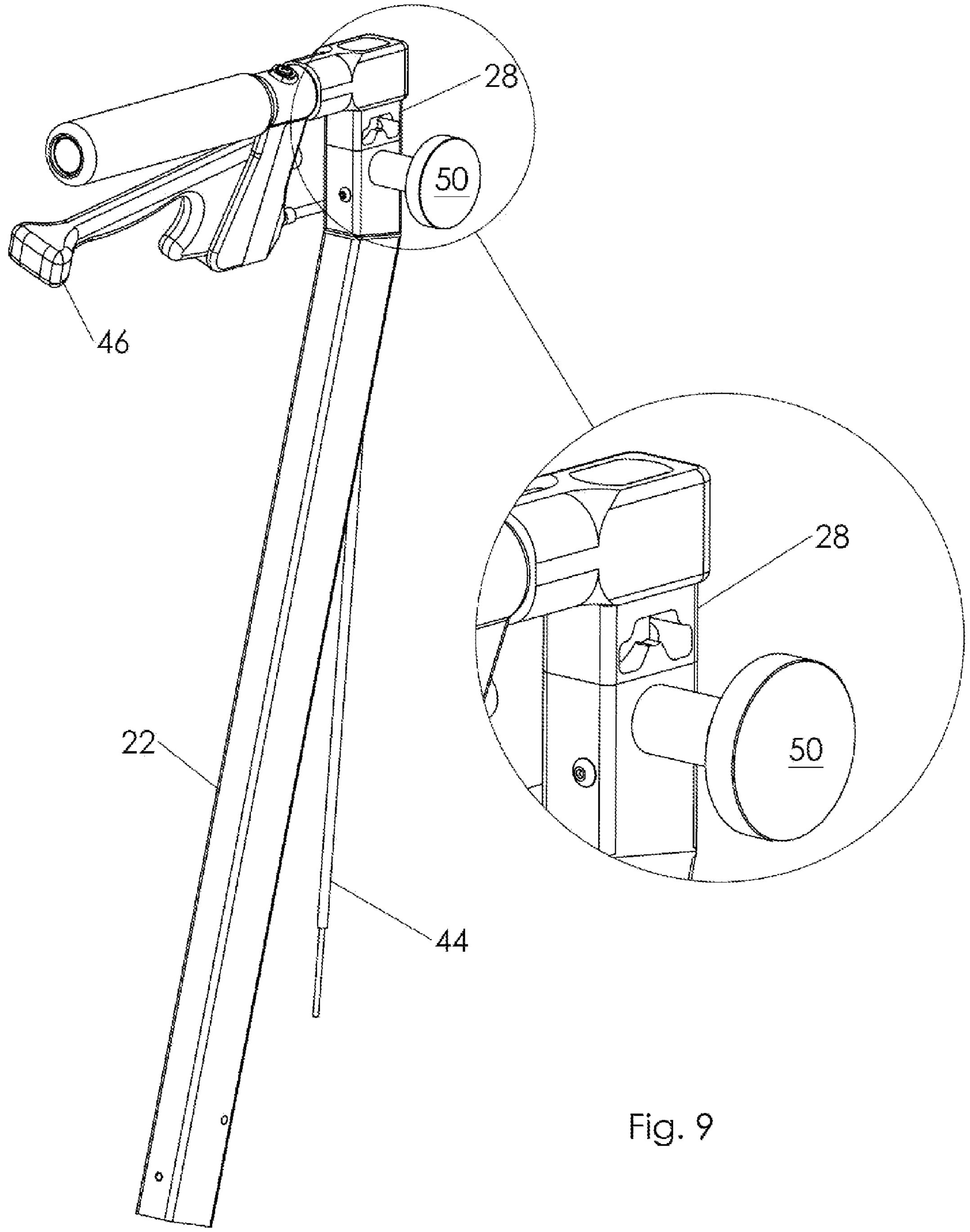
FIG. 9 is a perspective view of a right handgrip of mobility device of FIGS. 1*a*, 1*b*, and 2.
Figure 10:
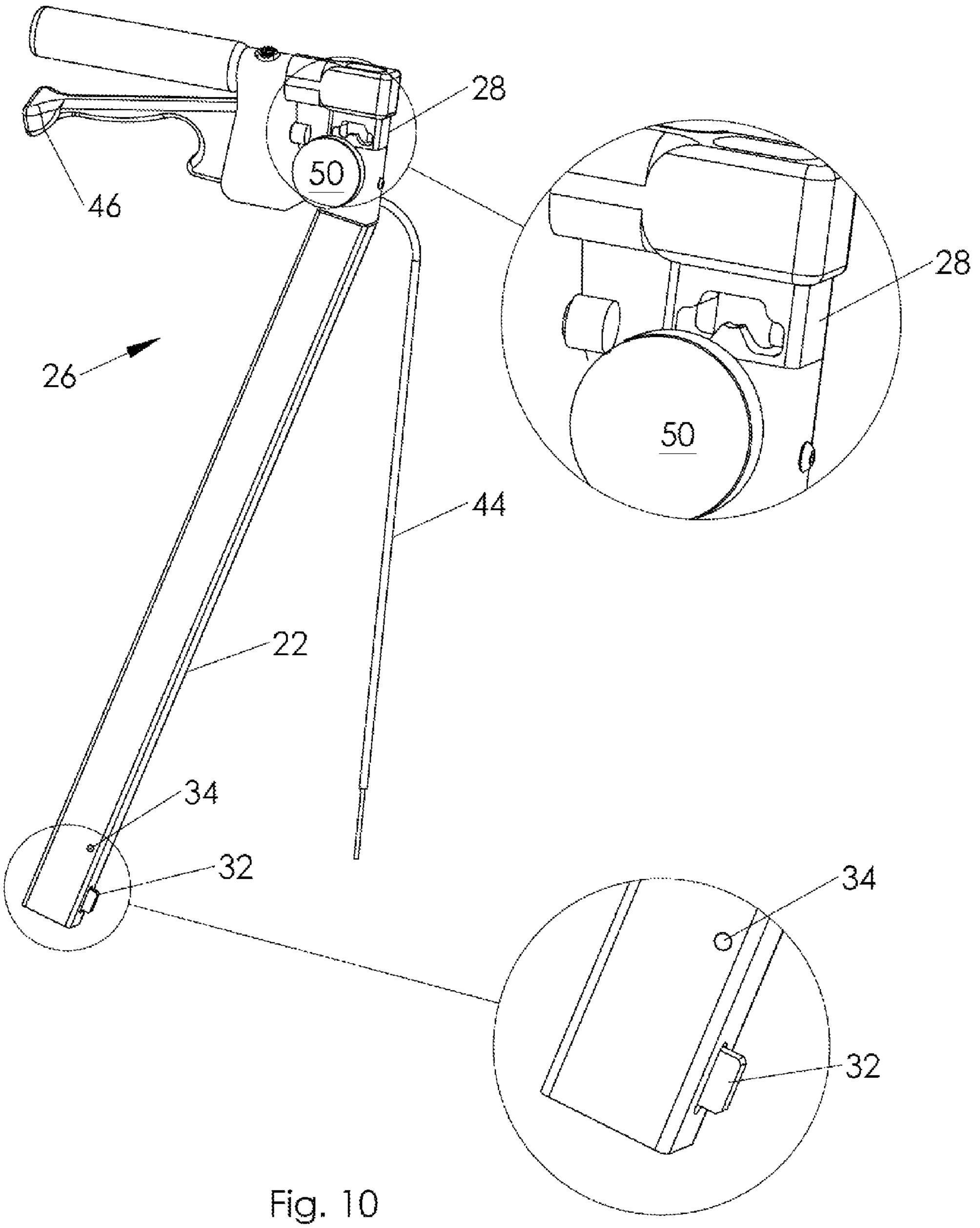
FIG. 10 is another view of the right handgrip of the mobility device of FIGS. 1*a*, 1*b*, and 2.
Figure 11:
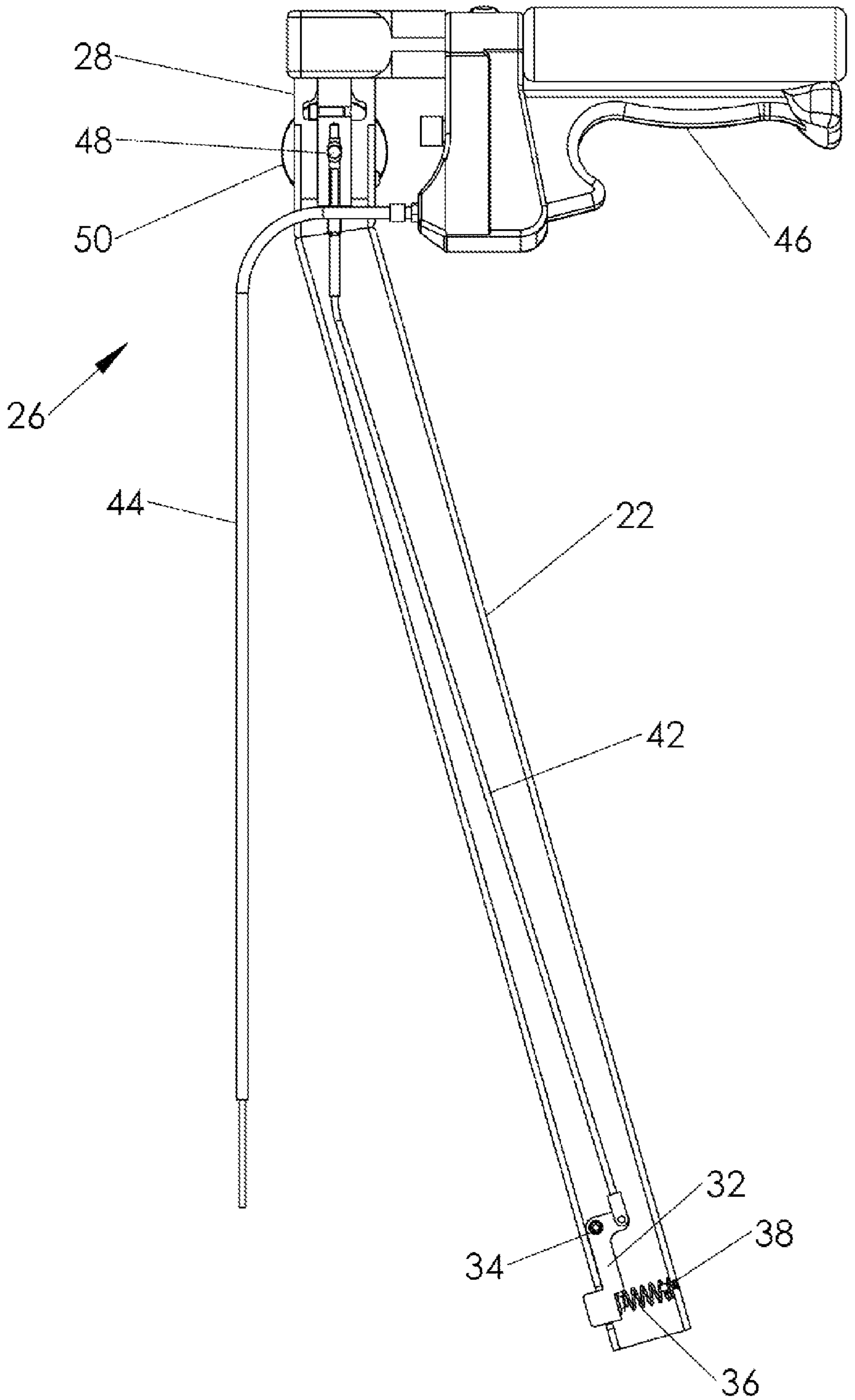
FIG. 11 is a partial interior side view of the handgrip of FIG. 10.
Figure 12:
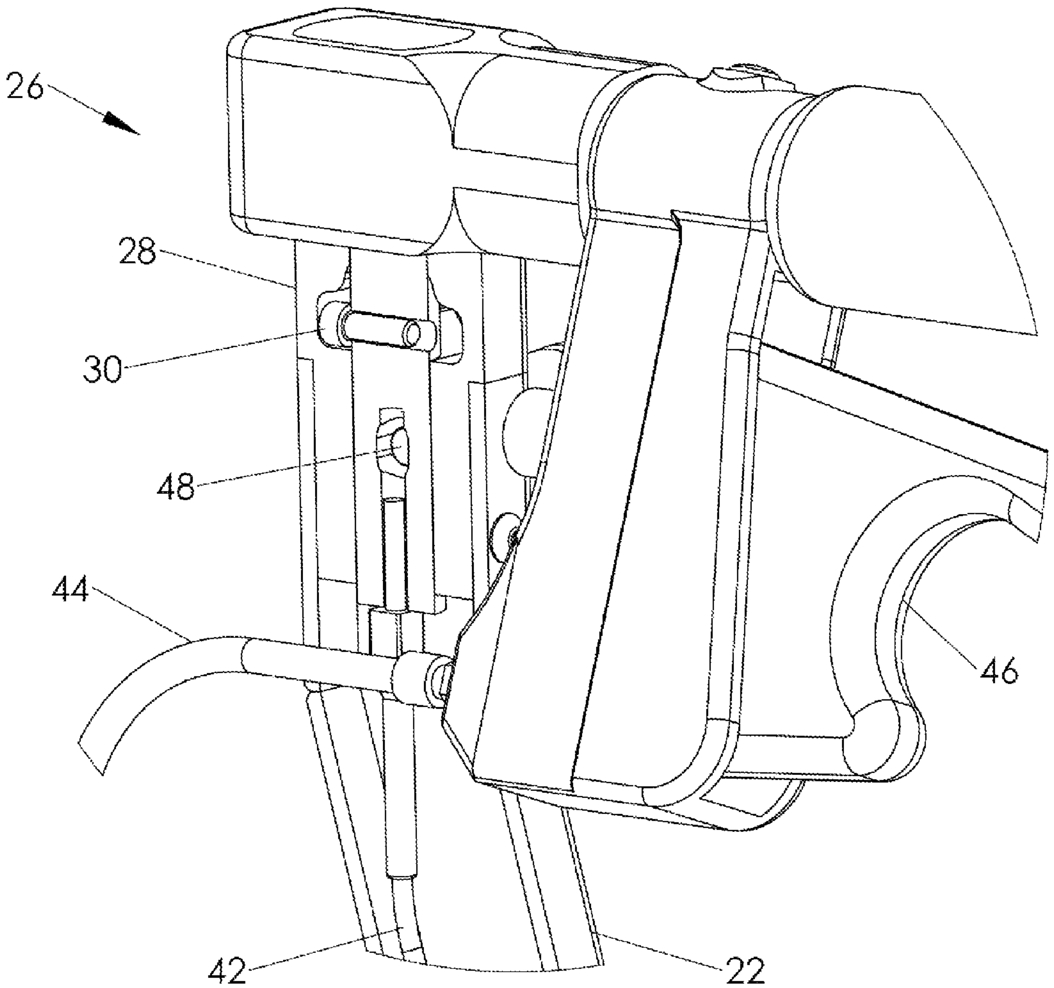
FIG. 12 is another partial interior view of the handgrip of FIGS. 10 and 11.
Figure 13:
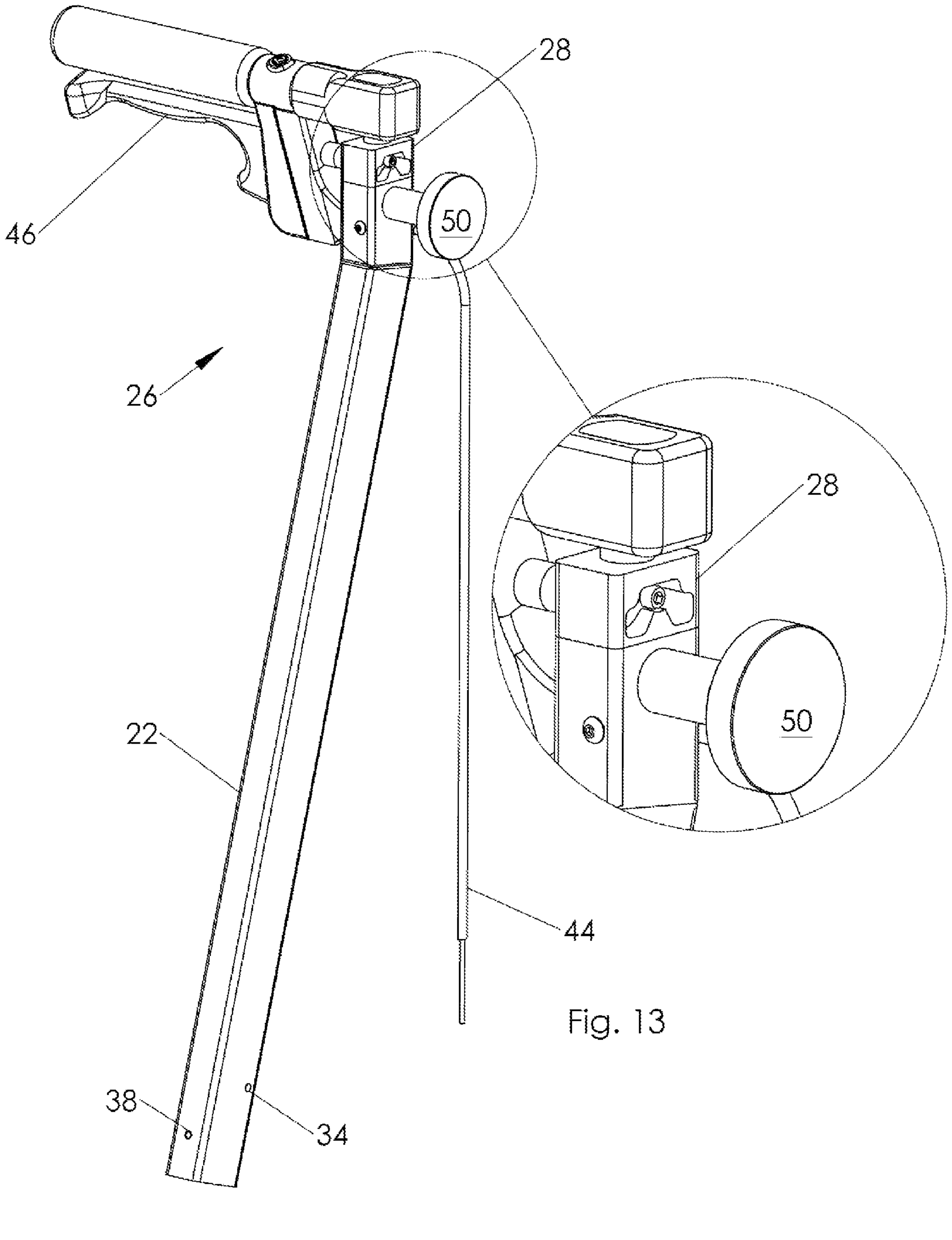
FIG. 13 is another view of the right handgrip of FIGS. 10-12 with the handgrip rotated.
Figure 14:
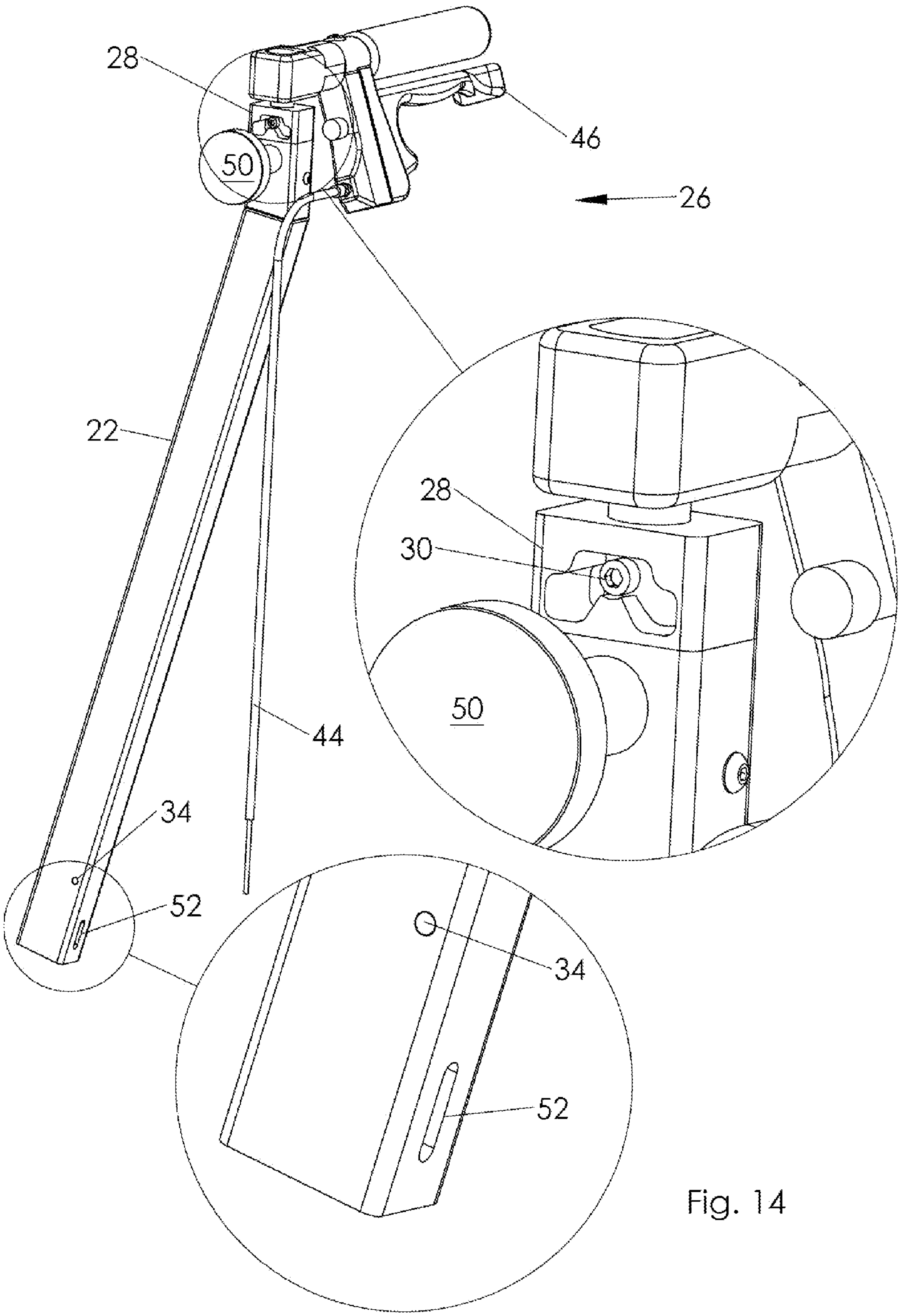
FIG. 14 is another view of the rotated handgrip of FIG. 13 also illustrating the retraction of locking mechanism from the inner tube.
Figure 15:
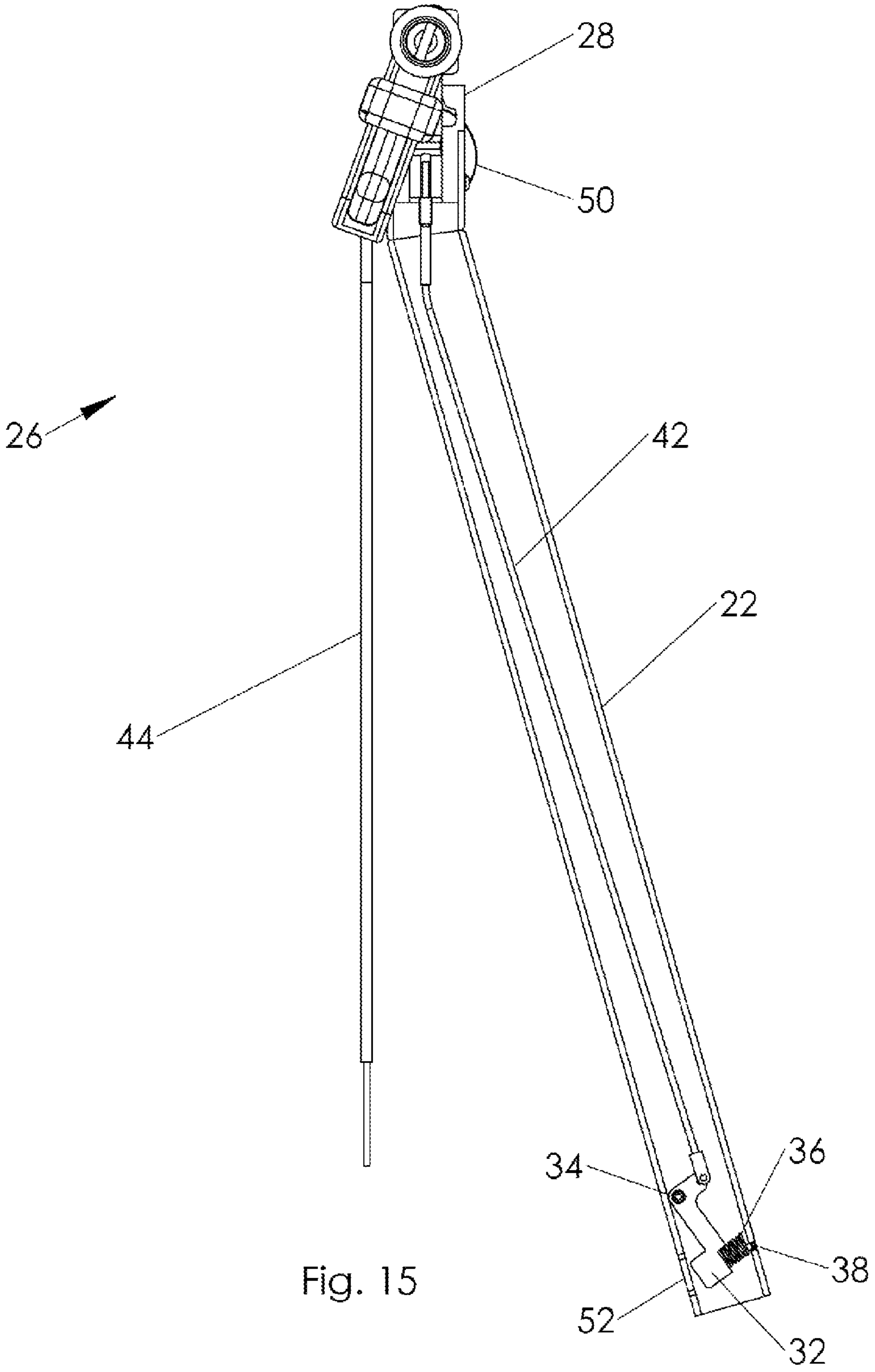
FIG. 15 is a partial interior side view further illustrating the retraction of the locking mechanism of the rotated handgrip of FIG. 14.
Figure 16:
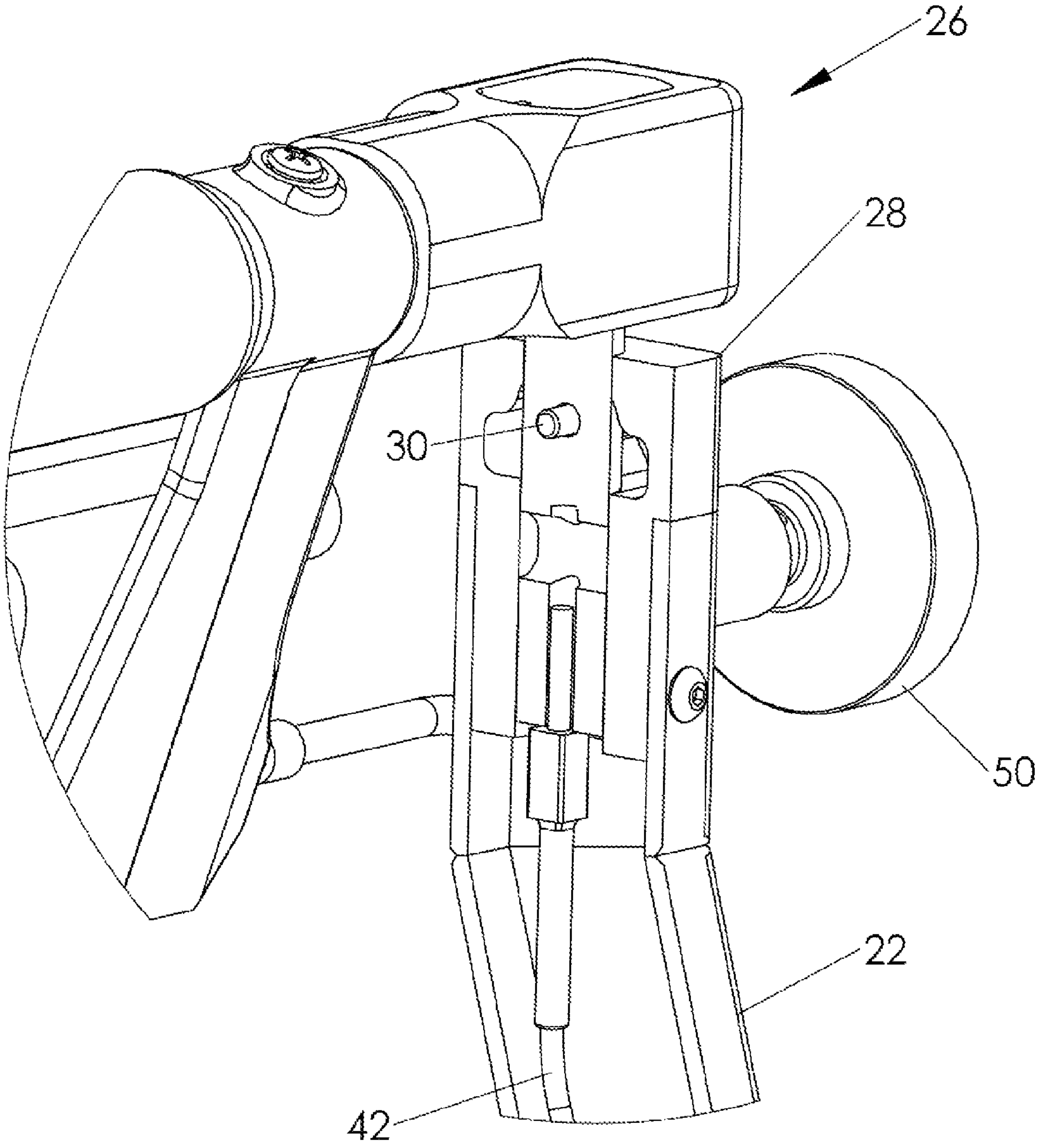
FIG. 16 is another view of the rotated handgrip illustrating the positions of some of the internal parts of the handgrip of FIGS. 13-15.
Figure 17:
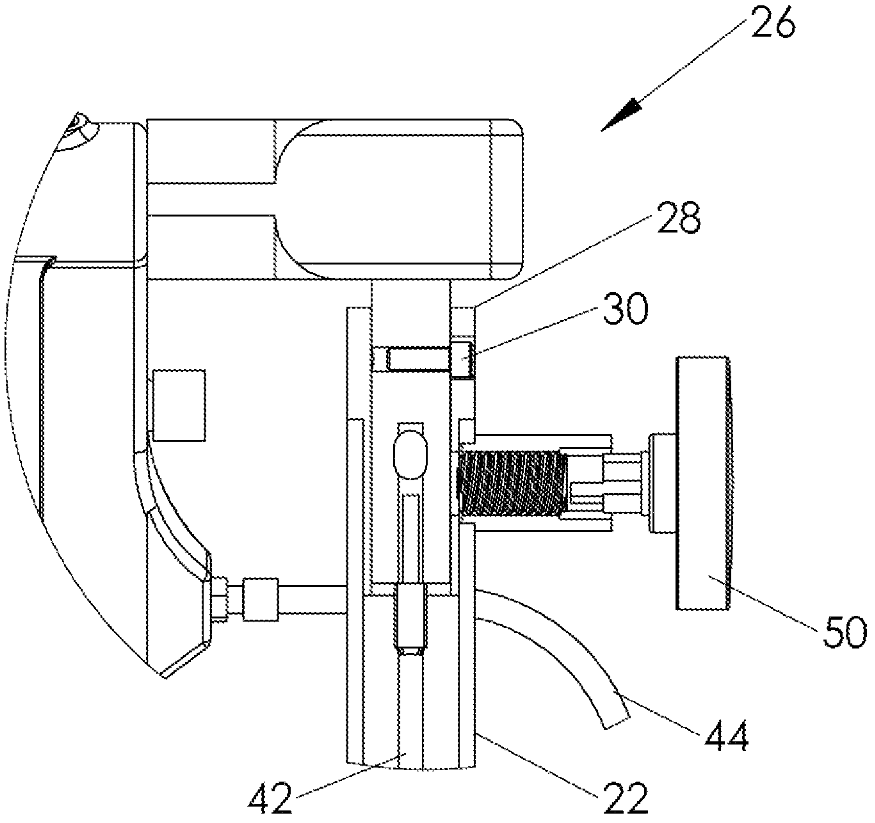
FIG. 17 is another partial interior view of some of the internal parts of the handgrip of FIGS. 13-16.
Figure 18:
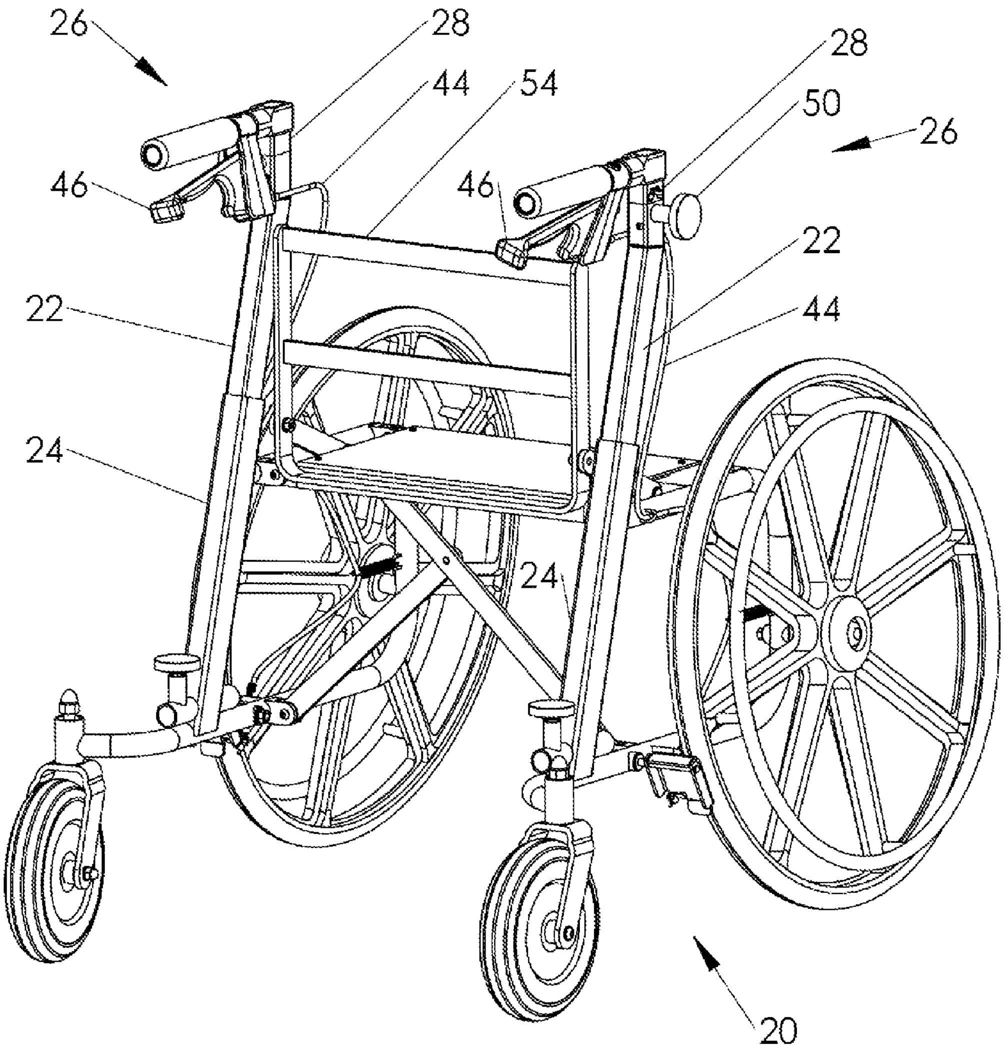
FIG. 18 is a perspective view of the mobility device of FIG. 1*b*, with the handgrips rotated to a reverse position as that shown in FIG. 1*b*.
Figure 19:
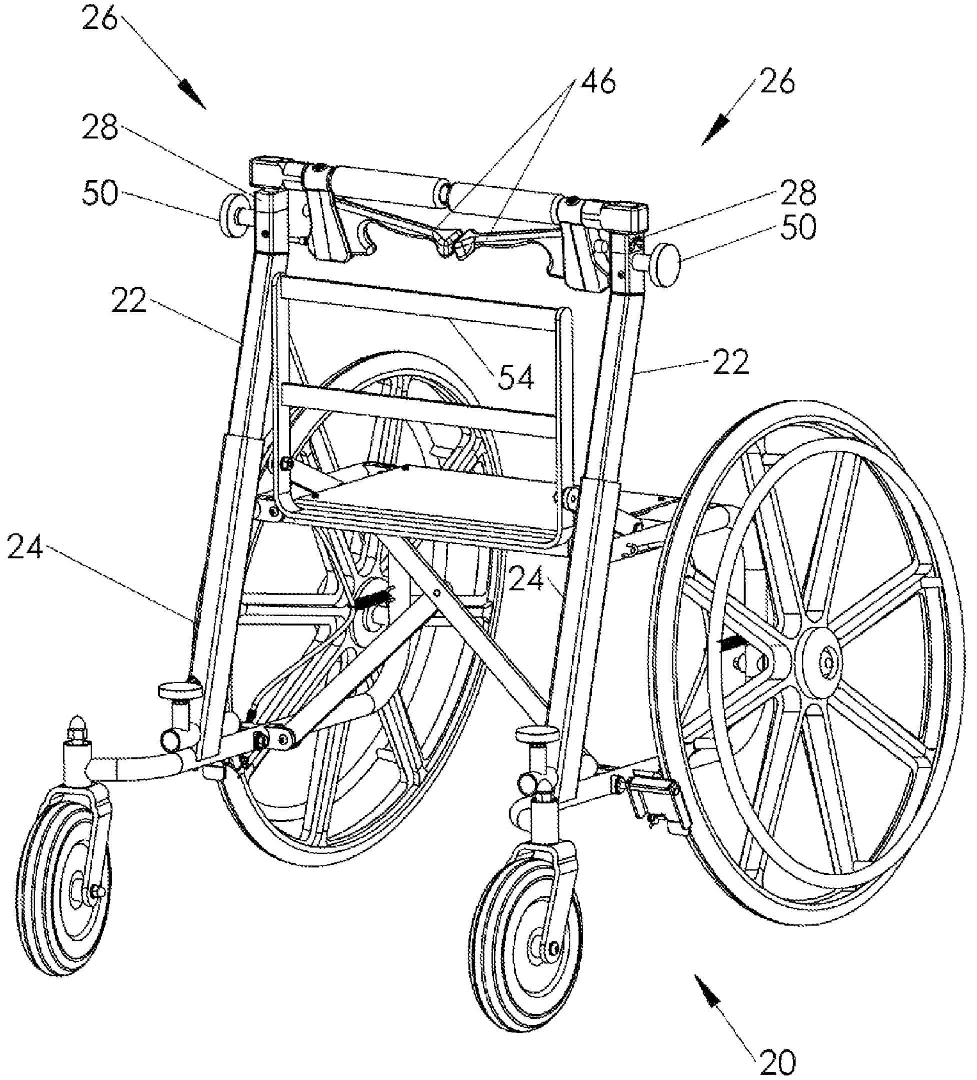
FIG. 19 is a perspective view of the mobility device of FIG. 18 with the handgrips rotated to a position that allows the vertical adjustment of the handgrips.

As can be seen in FIG. 7, pin 48 is engaged preventing any movement of handgrip 26 in a rotatable manner relative to tube 22. Pin 48 can also engage the assembly when handgrip 26 is rotated to a position 180° from that shown in FIG. 7. Two positions of handgrips 26 are illustrated in the two views afforded by FIGS. 1*b* and 18. In FIG. 8 knob 50 is pulled or otherwise retracted to thereby move pin 48 in an outward direction to thereby release the handgrip 26 so that it can rotate relative to tube 22. FIGS. 9-12 illustrate pin 48 being engaged and handgrip assembly 26 retaining tubes 22 and 24 in a fixed position relative to each other. In FIG. 13 with knob 50 having been pulled out and a portion of handgrip assembly 26 has been rotated approximately 90° relative to its position in the former figures causing cap screw 30 to be positioned in a new location as seen in the inset of FIG. 13 also the upper portion of handgrip assembly 26 is slightly elevated relative to guide block 28. This particularly slight vertical movement causes the retraction of latch plate 32 as can be seen in FIGS. 14 and 15. The rear portion of cap screw 30 can be seen in FIG. 16 in its elevated position as it has moved along the ramped portion in guide block 28 to thereby pull the inner portion of release cable 42, which is also illustrated in the inner view of handgrip assembly 26 as illustrated in FIG. 17. Once the handgrip assembly is positioned approximately vertically in a desired position, handgrip assembly 26 is rotated 90° back to either of its normal positions and with an optional slight vertical movement either up or down latch plate 32 will then again engage tubes 22 and 24 to position them in the desired location. Perhaps prior to that engagement when the upper handgrip assembly 26 is rotated back to one of its normal positions, then pin 48 also returns to its normal location thereby locking upper portion of handgrip assembly 26 in a normal operational position.

The symmetrical nature of the ramp in guide block 28 helps to show how handgrips 26 can be rotated and locked in two positions substantially 180° apart, and yet the intermediate position where handgrips 26 are rotated approximately 90° is the position in which latch plates 32 disengage from slot 52 allowing the longitudinal movement of tube 22 relative to tube 24. Although tubes 22 and 24 are shown at a small angle to vertical, they can also be oriented in a substantially vertical manner. Guide block 28 is geometrically configured so that an angle of tube 22 is altered to establish the plane of movement of handgrips 26 as they rotate. The plane of movement is nominally or approximately normal to the longitudinal direction of tube 22. This plane of movement is substantially parallel with the plane of the surface upon which mobility device 20 traverses, which may be the ground.

As a general observation the orientation of handgrips 26, in FIGS. 1*a*, 1*b*, and 2 correspond to that shown in FIGS. 3-8. The orientation of handgrips 26 in FIG. 18 corresponds that shown in FIGS. 9-12, and the orientation of handgrips 26 in FIG. 19 corresponds to that shown in FIGS. 13-17.

Advantageously handgrip assemblies 26 can be positioned in a generally lower position so that when someone is sitting in the seat of mobility device 20 the handgrip assemblies 26 can serve as support under the arms of the individual and when handgrip assemblies 26 are extended the mobility device 20 can serve as a walker by an individual walking there behind. Another advantage of the present invention is that the levers 46 travel with the handgrips so that they are always available to the user even when the height of the handgrip assembly is being adjusted. Another advantage of the present invention is that it allows for a quick, non-tool adjustment of the height of the handgrip assembly of tubes 22 and 24, which remain unrotated during the operation. Yet another advantage of the present invention is that the handgrips are orientable in either direction of the two main directions that mobility device 20 will move. The handgrips serve several functions including the locking and adjustable movement of the height of the handgrips based on their rotated position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mobility device, comprising:

a frame;

a plurality of wheels rotatably coupled to said frame;

a pair of telescopically arranged assemblies coupled to said frame;

a pair of handgrips each coupled to a corresponding one of said pair of telescopically arranged assemblies, said pair of handgrips arranged to adjust a height of said pair of telescopically arranged assemblies, each of said pair of handgrips are releasable to rotate approximately 180°, with an intermediate position of approximately 90° releasing a corresponding one of said pair of telescopically extending assemblies to be adjustable in a longitudinal direction of said telescopically arranged assembly; and a latch plate that disengages from said telescopically arranged assemblies when the handgrips are in the intermediate position.

2. The mobility device of claim 1, wherein said telescopically arranged assemblies are individually adjustable.

3. The mobility device of claim 2, wherein each of said pair of handgrips are rotatably coupled to the corresponding telescopically arranged assembly, the rotation of said handgrips in one direction allowing the corresponding telescopically arranged assembly to be extended or retracted, the rotation of said handgrips in another direction preventing the corresponding telescopically arranged assembly from extending or retracting.

4. The mobility device of claim 3, further comprising a pair of braking devices one of which being associated with one of said plurality of wheels on one side of the mobility device and the other braking device associated with one of said plurality of wheels on the other side of the mobility device, each of said pair of braking devices having a control coupled to a handgrip, said control remaining functional even while said handgrip is rotated.

5. The mobility device of claim 3, wherein the rotation of said handgrips is substantially parallel to the ground.

6. The mobility device of claim 5, wherein the rotation of one handgrip to allow the corresponding telescopically arranged assembly to extend or retract is a minor image of the rotation of the other handgrip.

7. The mobility device of claim 6, wherein said telescopically arranged assemblies are not cylindrical tubes.

8. The mobility device of claim 1, further comprising a seat coupled to said frame.

9. The mobility device of claim 8, wherein said pair of handgrips are positionable in a first position under the arms of a person sitting in said seat and positionable in a second position for gripping by the person when the person is walking behind the mobility device.

10. The mobility device of claim 1, wherein said latch plate engages said telescopically arranged assembly when said handgrips are in either of the two 180° positions thereby placing said latch plate in a locking position.

11. The mobility device of claim 1, wherein each of said pair of handgrips is lockable in a first position and a second position, said first position and said second position being approximately 180° apart.

12. A telescopically arranged assembly for use with a mobility device having a frame and a plurality of wheels rotatably coupled to the frame, the telescopically arranged assembly comprising:

an outer tube;

an inner tube arranged in a telescopical manner with said outer tube, said outer tube being coupled to the frame;

a handgrip coupled to the inner tube, said handgrip controlling an adjustable position of said inner tube relative to said outer tube, said handgrip being releasable to rotate approximately 180°, with an intermediate position of approximately 90° releasing said inner tube from said outer tube such that said inner tube may move longitudinally relative to said outer tube while said handgrip is in said intermediate position; and a latch plate that disengages from said outer tube when said handgrip is in the intermediate position.

13. The assembly of claim 12, wherein said handgrip is rotatably coupled to said inner tube

14. The assembly of claim 13, wherein the rotation of said handgrip in one direction allows said inner tube to be extended or retracted relative to said outer tube, the rotation of said handgrip in another direction preventing the inner tube from extending or retracting relative to said outer tube.

15. The assembly of claim 14, further comprising a braking control connected to said handgrip, the braking control being associated with a braking device coupled to one of the plurality of wheels on one side of the mobility device, said braking control remaining functional even while said handgrip is rotated.

16. The assembly of claim 14, wherein the rotation of said handgrips is substantially parallel to the ground upon which the mobility device sets.

17. The assembly of claim 16, wherein said inner tube and said outer tube are not cylindrical tubes.

18. The assembly of claim 12, wherein the mobility device further includes a seat coupled to the frame.

19. The assembly of claim 18, wherein said handgrip is positionable in a first position under an arm of a person sitting in the seat and positionable in a second position for gripping by the person when the person is walking behind the mobility device.

20. The assembly of claim 12, wherein said latch plate engages said outer tube while said handgrip is in said intermediate position.

* * * * *

UNITED STATES PATENT AND TRADEMARK OFFICE

CERTIFICATE OF CORRECTION

PATENT NO. : 8,534,683 B2
APPLICATION NO. : 13/347096
DATED : September 17, 2013
INVENTOR(S) : Lloyd L. Lautzenhiser et al.

It is certified that error appears in the above-identified patent and that said Letters Patent is hereby corrected as shown below:

On the Title Page

Item (73) under Assignee, please delete “MN”, and substitute therefore --MT--.

Signed and Sealed this
Thirtieth Day of December, 2014

Michelle K. Lee
*Deputy Director of the United States Patent and Trademark Office*